US007757213B2

(12) United States Patent
Fusaro et al.

(10) Patent No.: US 7,757,213 B2
(45) Date of Patent: Jul. 13, 2010

(54) AGGREGATION-BASED MANAGEMENT OF A DISTRIBUTED BUSINESS PROCESS APPLICATION

(75) Inventors: Eddie Fusaro, Redmond, WA (US); Vladimir Pogrebinsky, Issaquah, WA (US); Arunachallam S. Sivakumar, Issaquah, WA (US); Satish R. Thatte, Redmond, WA (US); Neilton J. Saari, Seattle, WA (US); Wei Xiao, Bellevue, WA (US); Girish Mittur Venkataramanappa, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1393 days.

(21) Appl. No.: 11/132,056

(22) Filed: May 18, 2005

(65) Prior Publication Data

US 2006/0265231 A1 Nov. 23, 2006

(51) Int. Cl.
*G06F 9/44* (2006.01)
*G06F 3/00* (2006.01)
*G06F 3/048* (2006.01)

(52) U.S. Cl. .................. 717/120; 717/107; 719/320; 719/328; 715/762; 715/764

(58) Field of Classification Search .................. None
See application file for complete search history.

(56) References Cited

U.S. PATENT DOCUMENTS

| 7,107,577 | B2* | 9/2006 | de Boer et al. | ............. 717/121 |
|---|---|---|---|---|
| 7,120,896 | B2* | 10/2006 | Budhiraja et al. | ........... 717/105 |
| 7,340,747 | B1* | 3/2008 | Zeliger et al. | ............... 719/328 |
| 2002/0066074 | A1* | 5/2002 | Jabri | ......................... 717/105 |
| 2005/0273758 | A1* | 12/2005 | Long | ......................... 717/101 |
| 2007/0245294 | A1* | 10/2007 | Saito et al. | .................. 717/100 |
| 2008/0301638 | A1* | 12/2008 | Apte et al. | .................. 717/120 |

\* cited by examiner

*Primary Examiner*—Tuan Q Dam
*Assistant Examiner*—Hanh T Bui
(74) *Attorney, Agent, or Firm*—Workman Nydegger

(57) ABSTRACT

A system for managing an application set is disclosed. The system includes a wrapper that designates a component as belonging to the application set and an interface that provides access to the component. The system also includes a control module that uses the interface to manage the component. Methods of using the system are also provided.

20 Claims, 12 Drawing Sheets

AGGREGATION-BASED MANAGEMENT OF A DISTRIBUTED BUSINESS PROCESS APPLICATION

TECHNICAL FIELD

The subject invention relates generally to the field of distributed computing and more particularly to systems and methods for managing cooperating computing components in a distributed environment.

BACKGROUND

As software engineering techniques have matured in the past several years, componentization and reuse have become the preferred techniques by which robust enterprise applications are created. Modem enterprise applications are customarily built as a cooperating system of loosely coupled components that are deployed and executed in a distributed hardware requirement. Furthermore, to preserve existing investments, it is common for companies to build new applications that address new business challenges by connecting together existing applications and systems that previously operated in isolation.

For example, a company can build a new order processing application by connecting together several existing legacy applications to accept orders from all of the partners of the company and process such orders in a highly automated fashion. As a result of this type of integration and automation, the company can reduce processing errors and dramatically reduce the time it takes to process orders. This type of business agility can give a company a competitive edge within an industry.

While distributed applications of this type can provide a great value and a wide range of benefits to a company, applications of this type are also inherently more complex to manage due to the number of cooperating components that make up the application. These types of applications are commonly comprised of a number of loosely coupled components including schemas, maps, adapters, pipelines, communication channels, business rules, security certificates, partner definitions, custom components, and configuration parameters, among others. This simple example above could easily include over 40 individual components. Adding to this problem is that with each newly deployed application, the complexity of the system increases dramatically as more components are deployed. Even with a relatively small deployment, it can be very difficult to discern the relationship among all the components. Moreover, components are typically deployed into a physically distributed environment of multiple hardware systems, making management of the components exceptionally difficult.

SUMMARY

The following presents a simplified summary in order to provide a basic understanding. This summary is not an extensive overview. It is neither intended to identify key or critical elements of the invention nor to delineate the scope of the invention. Its sole purpose is to present some concepts of the invention in a simplified form as a prelude to a more detailed description that is presented later. Additionally, section headings used herein are provided merely for convenience and should not be taken as limiting in any way.

In accordance with one aspect of the invention, a wrapper identifies each of a group of cooperating computing components as belonging to an application set. The application set can have an architecture that is preserved after the application set is deployed in a business environment and through maintenance of the application set. The application set can be deployed on a single computer or distributed across multiple machines, including virtual machines.

In accordance with another aspect of the invention, a user interface provides access to a control module. The control module can access an application set and individual components of the application set. Administrative tasks such as starting, stopping, and restarting the application set, or a component thereof, are provided by the control module.

In accordance with still another aspect of the invention, a user interface provides access to a configuration module. The configuration module can access and adjust various operating parameters of the application set. Additionally, the configuration module can access and adjust operating parameters of individual components of the application set.

In accordance with yet another aspect of the invention, a user interface provides access to a security module. The security module ensures that only authorized users can access the application set. In addition, the security module can create and enforce security policies such as limiting access to the application set or commands that can be invoked upon the application set.

In accordance with still yet another aspect of the invention, a communication module controls message passing functions of cooperating components within an application set and messages between or among application sets. Information used by resources that are shared among application sets, such as databases, can be isolated from other application sets. Additionally, message passing within an application set can be limited to defined components.

In accordance with a further aspect of the invention, a user interface provides access to an application health module. The application health module can monitor various aspects of an application set or its cooperating components and can determine when action is needed to correct an operational problem. In such instances, the application health module can prompt a user for attention or can attempt to diagnose and repair the problem automatically.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed. The subject invention is intended to include all such aspects and their equivalents. Other objects, advantages and novel features of the invention will become apparent from the following detailed description of the invention when considered in conjunction with the drawings.

DETAILED DESCRIPTION

Figure 1:
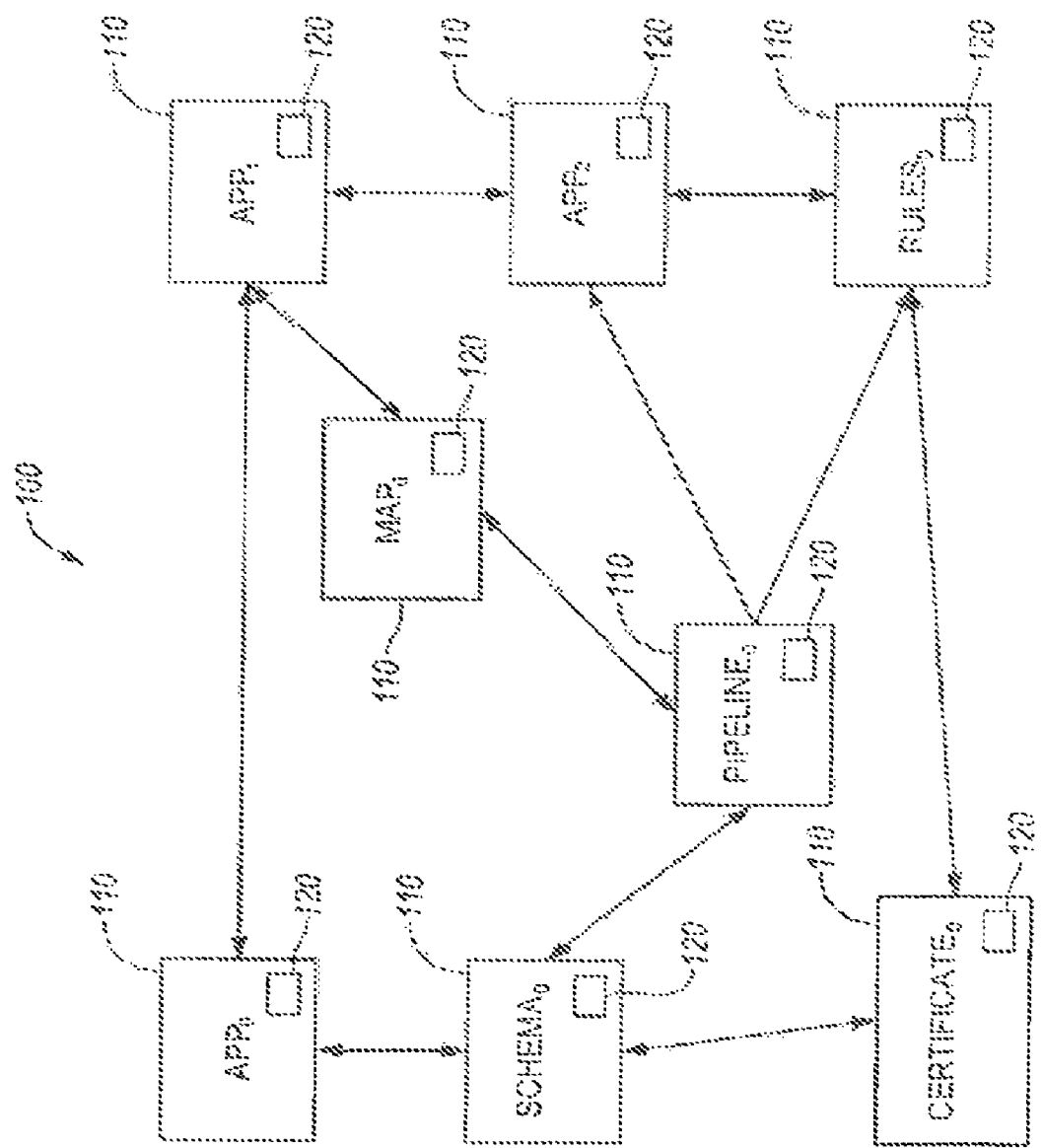
FIG. 1 is a system block diagram of an application set in accordance with one aspect of the disclosed invention.

The subject invention relates to systems and methods to facilitate replacement of software components. As used in this application, the terms "component," "system," "module," and the like are intended to refer to a computer-related entity, either hardware, software (for example, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention. Additionally, although specific examples set forth may use terminology that is consistent with client/server architectures or may even be examples of client/server implementations, skilled artisans will appreciate that the roles of client and server may be reversed, that the subject invention is not limited to client/server architectures and may be readily adapted for use in other architectures, specifically including peer-to-peer (P2P) architectures, without departing from the spirit or scope of the invention. Further, it should be noted that although specific examples presented herein include or reference specific components, the invention is not limited to those specific components and can be employed in other contexts as well.

FIG. 1 is a system block diagram of an application set 100 in accordance with one aspect of the disclosed invention. The application set 100 includes a group of cooperating components 110. Among the types of components 110 that can be included in the application set 100 are business applications, databases, expert systems, communications systems such as e-mail systems and web servers, among others, schemas, maps, security certificates, rules bases, work flows, and configuration files. Such included components can be custom-created or off-the-shelf packages.

The application set 100 also includes a wrapper 120. The wrapper 120 can be a conceptual wrapper such as a tag that is applied to each component 110 to identify the component 110 as part of a specific application set 100. The wrapper 120 can also be a record or set of records in a data store that includes an entry for each component 110 of the application set 100. Additionally or alternatively, the wrapper 120 can be a type of bundling component such as a data structure or an object that encapsulates each component 110 of the application set 100. Another suitable wrapper can be used.

Each component 110 included in the application set 100 is a cooperating component. Components, such as each component 110, can cooperate in the sense that each such component 110 can interact with at least one other component 110 of the application set 100. For example, one of the components of the application set 100 can be a database. That database can run queries to obtain specified information and output that information to a web server. The web server can present the information from the database and accept new information, such as a purchase order, through a web-based interface. That purchase order information can be sent to an accounting and billing system to create an account entry. The account entry can be sent to a word processing program to create an invoice to be printed sent to a customer. Each of these cooperating components can access at least one other cooperating component such as a schema, a rule base, a map, or another component as necessary to perform part of a computing task.

The wrapper 120 provides a means by which a set of cooperating components can be identified as part of a system or an application set such as the application set 100. By wrapping or bundling cooperating components, a framework for using and managing those components as a single unit can be created. Inclusion in the wrapper 120 not only defines a component as a part of the application set 100 but also preserves an architecture created by an initial designer of the system. Preservation of the architecture can help during later stages of a life cycle of an application set, for example, during maintenance.

Use of the wrapper 120 to create an application set 100 can also assist during initial design and deployment processes. During design, an implementer can have a clearer picture of components of the application set 100 and how those components interact. During deployment, the implementer can readily see a distribution of components of the application set 100 in the context of a physical placement of a component on a specific computer. In this manner, communication between or among components of an application set, or even between or among multiple application sets, can more readily be managed. Issues dealing with physical computing components, for example, disk drives, processors, communication links, and so forth, can also be mapped to components of an application set so that effects of hardware failures can be identified and mitigated.

Such packaging of cooperating components of an application set can be useful at all stages of an application life cycle. During initial development, the wrapper concept imposes a logical grouping on cooperating components to assist in architecture and data flow design tasks, among others. This aggregation can greatly assist in visualizing a design of a system which itself can include components that are aggregations of smaller cooperating components or which includes a large number of cooperating components that are unwieldy to manage.

For example, a business order taking and processing system can include hundreds of components, all of which cooperate to achieve an overall goal. Such a system can include multiple web interfaces for customers and employees, accounting systems, billing systems, email or other electronic messaging systems, databases, manufacturing systems, and inventory control systems, among others. Each of these components can be a system in its own right. There can be a tendency to view each component as simply a link in a processing chain instead of as a part of an integrated whole. Use of a wrapper to define an application set provides a system-level framework within which design choices can be made and implemented.

Components of an application set can be deployed over a wide range of systems in a highly distributed fashion. Using a wrapper to aggregate cooperating components can assist in mapping individual components to a hardware system. Such aggregation can also assist in visualizing a hardware architecture that supports the cooperating components. This process can assist in identifying and resolving performance issues that have a primary basis in hardware but have symptoms that are exhibited in software. For example, a specific component of an application set can be identified as a bottleneck that is slowing processing of the application set as a whole. A mapping of that component to a piece of hardware can disclose that the hardware upon which the specified component is executing has insufficient processing capabilities to adequately support the specified component. A user can rapidly adjust the deployment to provide adequate processing resources to the component and remove the processing bottleneck from the application set.

During its operational life, an application set can undergo a multitude of configuration adjustments that affect overall operation of the application set 100. Moreover, a configuration change to a single cooperating component of an application set can have wide-reaching and unexpected consequences upon other cooperating components or the application set as a whole. Use of a wrapper to define an application set can help illustrate and preserve an architecture of the application set such that effects of changes made can be easily identified and studied.

Figure 2:
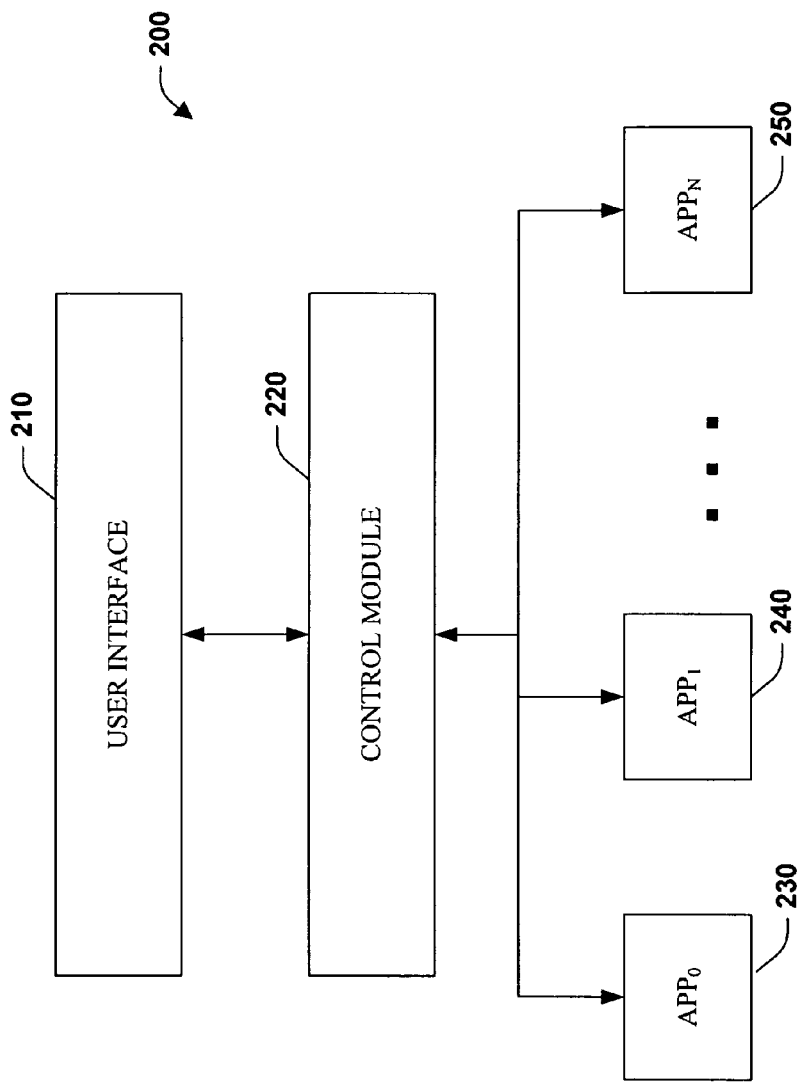
FIG. 2 is a system block diagram of a distributed computing system in accordance with another aspect of the described invention.

FIG. 2 is a system block diagram of a distributed computing system 200 in accordance with another aspect of the described invention. The distributed computing system 200 includes a user interface 210. The user interface 210 can be a graphical user interface ("GUI") or a text-based interface such as a command line. More specialized user interfaces such as integrated development environments or management environments can also be employed. More than one interface can also be used depending upon a variety of factors, such as a task desired to be performed or permission of a user to access the distributed computing system 200, among others.

The user interface 210 can communicate with a control module 220. The control module 220 can manage each of a plurality of application sets 230, 240, 250. Each of the plurality of application sets 230, 240, 250 includes a plurality of cooperating computing components similar to the cooperating computing components discussed in conjunction with the application set 100 of FIG. 1. The control module 220 can manage each of the plurality of application sets 230, 240, 250 at the set level, for instance, as an entire set. The control module 220 can also individually manage each of the cooperating components of each of the plurality of application sets 230, 240, 250 to provide component level control.

An example follows. In operation, the user interface 210 can be a GUI that provides a number of graphical widgets that can be displayed on a screen and manipulated or controlled in a variety of ways, such as by using a mouse or a keyboard. The user interface 210 provides access to the control module 220. At the application set level, the control module 220 can execute commands such as starting and stopping execution of the application set, among others. The user interface can also provide information relating to overall health of the application set, such as processing errors, missing or corrupted components, and other issues.

At the component level, the control module 220 can provide detailed control over each individual component of an application set such as one of the application sets 230, 240, 250. For example, the control module 220 can provide access to a configuration file to change its parameters. The control module 220 can provide means to add a rule to a rules base. Essentially, the control module 220 can be used to perform any component level adjustment desired or appropriate.

As will be readily recognized, implementation details of the control module 220 depend largely upon the kinds of components that are included in each application set. Among features that can be included are text editors, database interfaces, and abilities to make system-level calls to start, stop, or interrupt executing processes. Other features that can be added include parsers to check syntax, grammar, or format of configuration or other files. Also possible are a number of validators to ensure that executable files have not been altered or corrupted, as well as other features. Such other features will be apparent to those of ordinary skill in the art and can depend upon a specific implementation.

Additionally, there are at least two major implementation choices for the control module 220. The first is to include the above-described functionality directly into a control module such as the control module 220. The second is to have the control module 220 invoke another process, such as a text editor, to assist the control module 220 in performing its task. Implementation along either approach or a combination of these approaches is largely a matter of design choice for a specific implementation.

Figure 3:
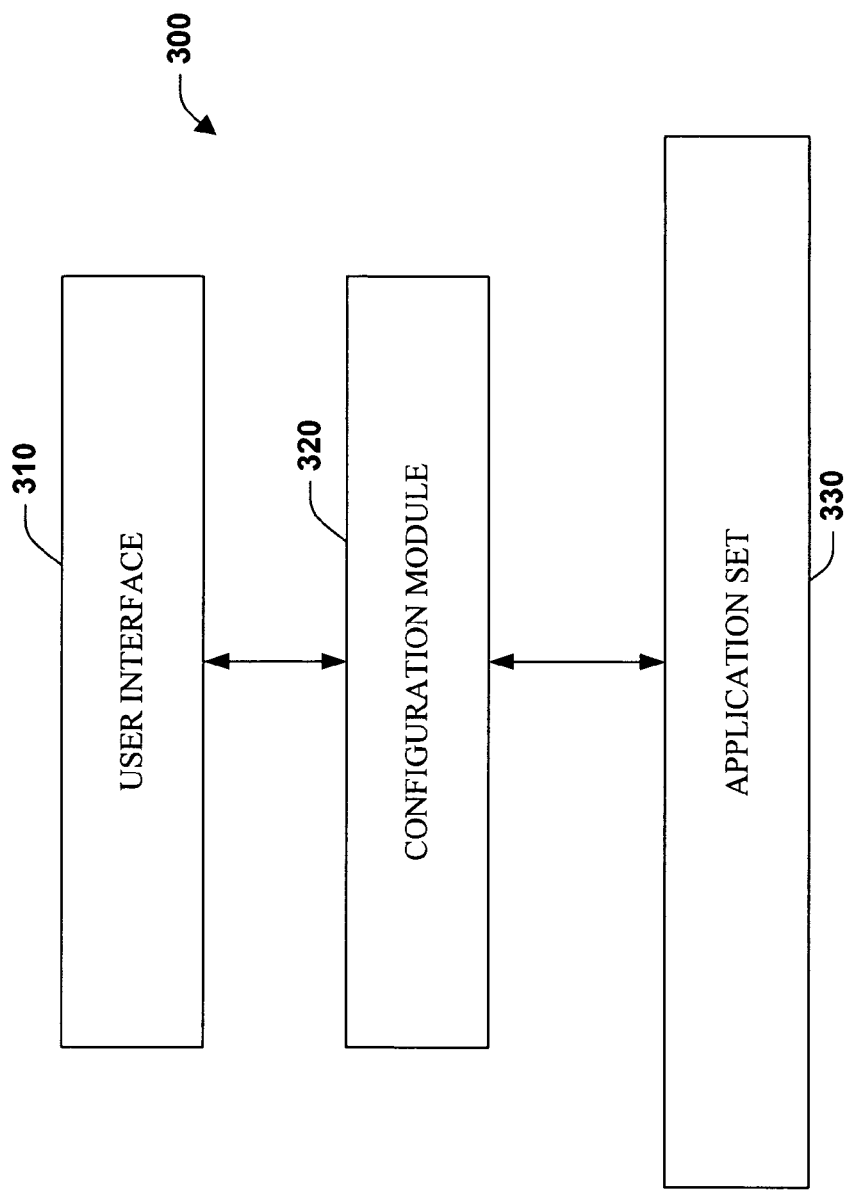
FIG. 3 is a system block diagram of a distributed computing system in accordance with another aspect of the disclosed invention.

FIG. 3 is a system block diagram of a distributed computing system 300 in accordance with another aspect of the disclosed invention. The distributed computing system 300 includes a user interface 310. The user interface 310 can be a GUI or a text-based interface such as a command line. More specialized user interfaces such as integrated development environments or management environments can also be employed. More than one interface can also be used depending upon a variety of factors, such as a task that is desired to be performed or permission of a user to access the distributed computing system 300, among others.

The distributed computing system 300 also includes a configuration module 320. The configuration module 320 can access individual components of an application set 330 to make adjustments to certain parameters of those individual components. For example, the configuration module 320 can access a word processing component to adjust or change a template from which the word processing component creates reports. The configuration module 320 can also access a rules base to add, change, or delete business logic rules that are applied to a processing flow among components of the application set 330. Additionally, the configuration module 320 can directly edit any configuration files or schemas used by other components of the application set 330 to indirectly affect operation of those other components.

Configuration of the application set 330 can occur primarily at three times. First, the configuration module 320 can configure individual components of the application set 330 prior to, or upon, start of processing of the application set 330. Configuration at this point in processing is akin to process initialization. Second, the configuration module 320 can make configuration changes while components of the application set 330 are operating. Such changes at this stage are suitable for relatively minor adjustments in operating parameters of components but can be used to make any change that does not require the entire application set 330 to be stopped. Individual components can be stopped or restarted, depending upon the change(s) made and component(s) affected. Third, the configuration module 330 can make changes in operating parameters just prior to stopping the application set 330. This option can be useful for making significant changes in the configuration of multiple components before restarting the application set 330 using the changed configuration settings.

Configuration settings can affect a variety of operational aspects of the application set 330 or one or more of the cooperating components of the application set 330. For example, latency of an individual component or the application set 330 as a whole can be affected. Additionally, throughput requirements, execution priority compared to other components, allocation of system resources such as memory, disk space, or peripheral devices, among others, and other configurable parameters can affect operation of each component, the application set, and other application sets.

In operation, the user interface 310 provides access to the configuration module 320 and provides a means to submit information or commands to the configuration module 320. The configuration module 320 accepts information or commands from the user interface 310 and applies such information or commands to a component or components of the application set 330. The configuration module 320 can also start, stop, or restart executable components of the application set 330 as needed or desired by an operator.

Figure 4:
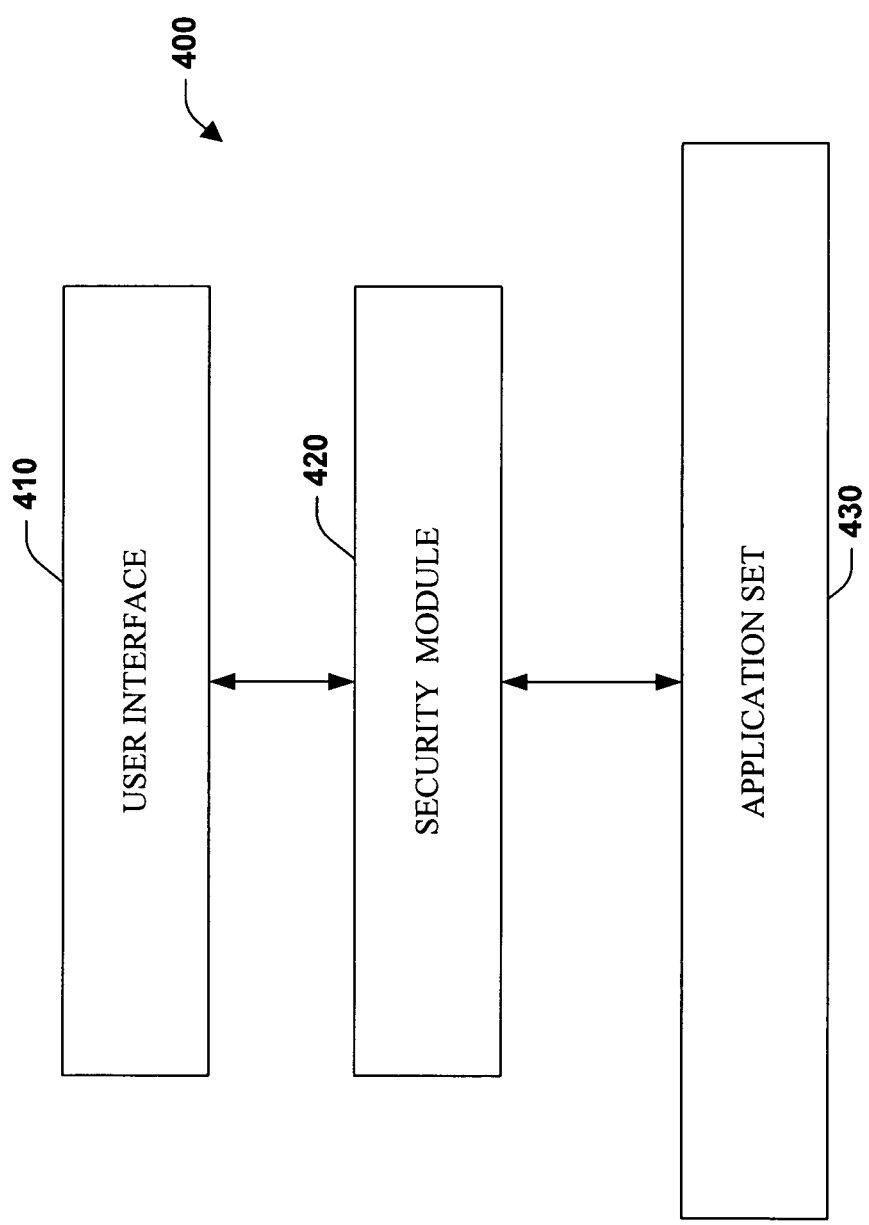
FIG. 4 is a system block diagram of a distributed computing system in accordance with yet another aspect of the subject invention.

FIG. 4 is a system block diagram of a distributed computing system 400 in accordance with yet another aspect of the subject invention. The distributed computing system 400 includes a user interface 410. The user interface 410 can be a GUI or a text-based interface such as a command line. More specialized user interfaces such as integrated development environments or management environments can also be employed. More than one interface can also be used depending upon a variety of factors such as a task desired to be performed or permission of a user to access the distributed computing system 400, among others.

The user interface 410 can communicate with a security module 420 that can access an application set 430. The security module is capable of handling access-related issues on several operational levels. One level includes ensuring that a user who attempts to access, operate, or modify the application set 430 is an authorized user. Authorization tasks can be handled in a number of ways. For example, a user can be required to provide a user name and password prior to being granted access. Other authentication schemes, including security tokens and biometric authentication devices, can be used instead of, or in addition to a user name and password authentication scheme.

The security module 420 can also enforce access limits for authorized users. For instance, a first authorized user can be granted restricted access such that the first user can change certain configuration files and not others, can monitor certain operations and not others, or can take only certain specified actions but be prohibited from performing others. A second authorized user can be given a different set of access abilities that may or may not overlap with the access abilities of the first user. An administrative user can be given unlimited access with the ability to take any action possible on the system, including shutting down or restarting the system. It should be recognized that these examples are illustrative only and that those of ordinary skill in the art will readily identify a number of different permutations or combinations of security access abilities that can be defined or granted.

Isolation of components of an application set is also possible. When application sets share components, users of each application set can see configuration and other settings for the shared component. It can also be possible that users could change a configuration and settings, can create new versions, or take other actions that can have consequences that reach beyond a single application set.

An example of the distributed computing system 400 in use follows. In operation, the user interface 410 can accept information or commands from a user. This information (or these commands) can be passed to the security module 420 for verification. At a first verification level, the security module checks to determine whether the information or command was issued by an authorized user. Authorization of the user can be performed by prompting for a user name and password, or by another suitable method such as using a biometric identity device. If the user is authorized, a second level of authorization can be invoked by determining whether any operational restrictions exist, such as restrictions on the ability to reference a specific application set like the application set 430 or the ability to issue certain commands such as startup, shutdown, or a specific configuration change.

In most implementations, it will be desirable to only check the identity of a user an initial time at the beginning of a user session. However, session or idle time-outs can be used to trigger prompts to provide a user name and password to continue to operate the system. Alternatively or additionally, some types of security modules, such as some radio frequency identification ("RFID") systems can require a user to remain within a specified physical proximity to a terminal or other piece of hardware. If a user moves out of range, the system can automatically lock and prompt for entry of user credentials before being reactivated for use.

Figure 5:
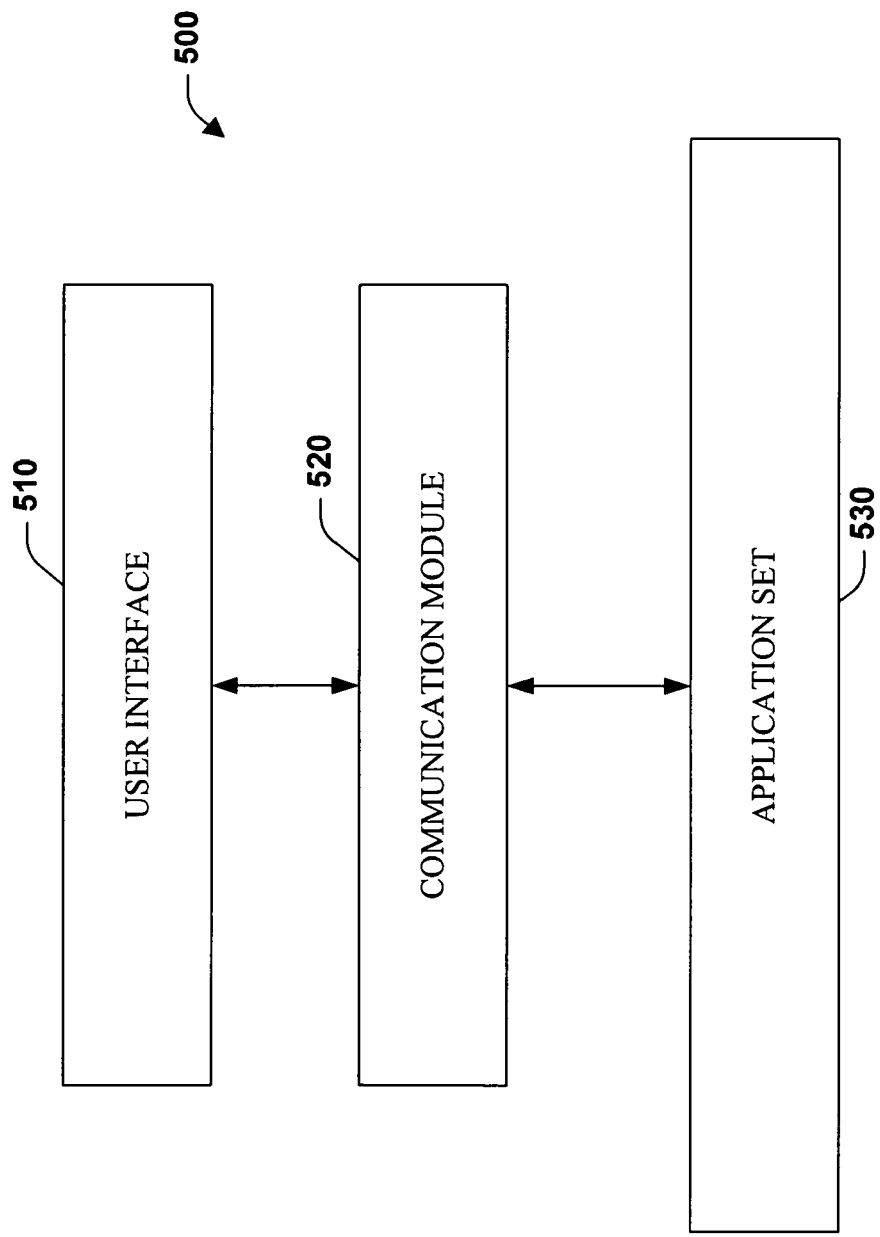
FIG. 5 is a system block diagram of a distributed computing system in accordance with still another aspect of the invention.

FIG. 5 is a system block diagram of a distributed computing system 500 in accordance with still another aspect of the invention. The distributed computing system 500 includes a user interface 510. The user interface 510 can be a GUI or a text-based interface such as a command line. More specialized user interfaces, such as integrated development environments or management environments, can also be employed. More than one interface can also be used depending upon a variety of factors such as a task desired to be performed or permission of a user to access the distributed computing system 500, among others.

The user interface 510 can communicate with a communication module 520. The communication module 520 can manage various aspects of communications between and among cooperating components of an application set 530 as well as between or among the application set 530 and another (or more than one other) application set(s). At least three modes of operation are possible to control message passing or other communications between application sets. First, total isolation is possible. Application sets can be prohibited from exchanging information between or among themselves. Second, limited sharing is possible. With limited sharing, applications can exchange or share messages that meet specified criteria. Third, full sharing of all messages is also possible. All three modes can be applied at the application set level as well to control communication exchanges between components of an application set.

A variety of mechanisms can be employed by the communication module 520 to control message exchanges. One possible implementation is for the communication module 520 to act as a central messaging system for all inter- and intraapplication set communications. The communication module 520 can maintain an address list that designates permitted communication paths between cooperating components or application sets. Communications traveling between listed components with an established path entry in the address list are permitted. Communications from a component to another component that is not on the address list are disallowed and can be flagged for investigation.

When application sets, such as the application set 530, are to fully or completely share messages, a permitted address list can be established at the application set level. Messages can be allowed or disallowed in a similar fashion as with component-level communications. Controlling communications at both levels can help prevent unauthorized parties from obtaining information from an application set that the party is not authorized to access by eavesdropping on messages sent to an application set that the party is authorized to access.

Communication problems become more complex when components, such as databases, are allowed to be part of more than one application set. Problems of this type can be mitigated in the case of databases by defining views through which another component must access the database. With other components, it can be useful to run multiple instances of that component. Still other components can be shared among application sets using a time-sharing scheme or the like. Further complicating matters is the situation when one or more components are run on a virtual machine that is running on a physical machine. By and large, all these communication problems can be adequately managed using techniques discussed here or by another suitable technique known in the art.

In operation, components of the application set 530 can send messages to other components of the application set 530 or to another application set. The message is sent to the communication module 520. The communication module 520 checks a source and a destination address of the message against entries in an allowed communication table. If the source address and the destination address of the message are listed in the allowed communication table, the communication module 520 can allow the message to pass. If one or both addresses (source and destination) are not listed, the communication module can drop or disallow the message. In cases where messages are disallowed, the communication module can log the occurrence or can notify a user.

Figure 6:
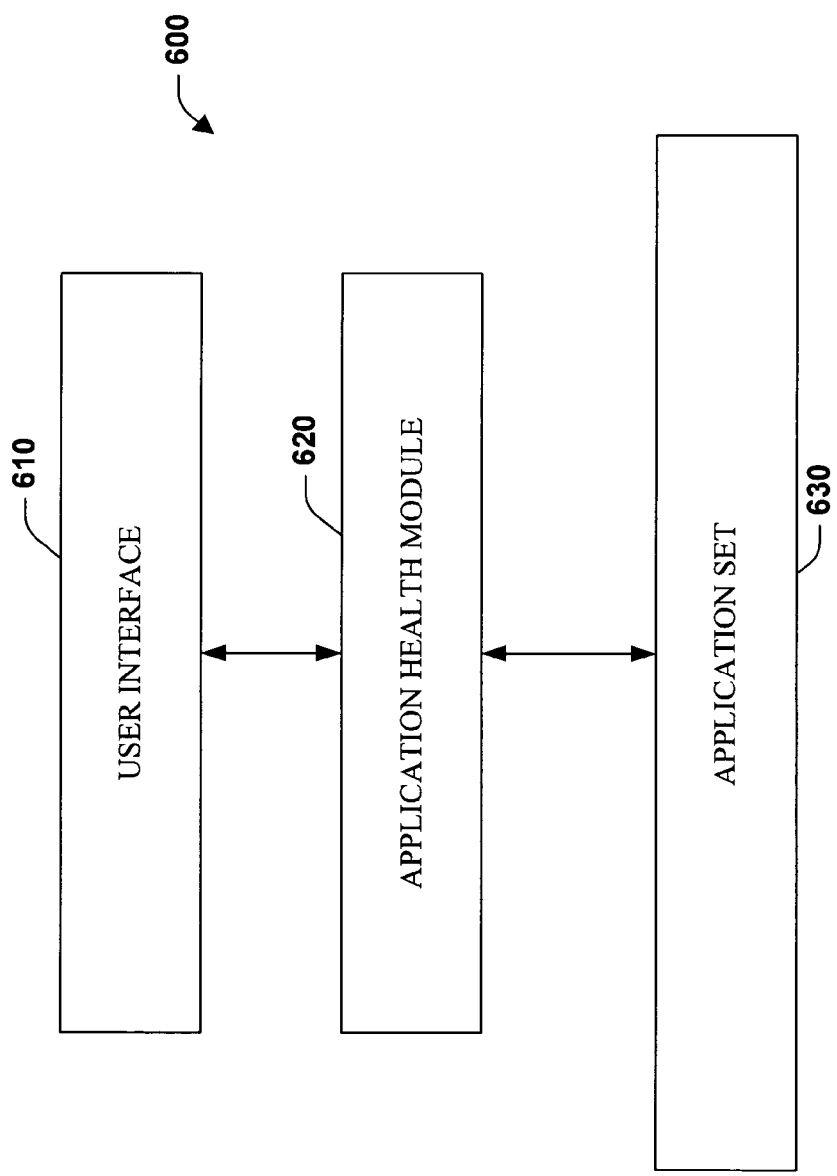
FIG. 6 is a system block diagram of a distributed computing system in accordance with still yet another aspect of the invention.

FIG. 6 is a system block diagram of a distributed computing system 600 in accordance with still another aspect of the invention. The distributed computing system 600 includes a user interface 610. The user interface 610 can be a GUI or a text-based interface such as a command line. The GUI can also be a browser-based interface. More specialized user interfaces such as integrated development environments or management environments can also be employed. More than one interface can also be used depending upon a variety of factors such as a task desired to be performed or permission of a user to access the distributed computing system 600, among others.

The user interface 600 can access an application health module 620. The application health module 620 can generally monitor various parameters of an application set 630 to determine an overall health status of the application set 630. Health status includes various operational capabilities such as latency, throughput, average processing time per job, error messages, system resource use, and other parameters. Health status can also include whether a component is damaged or misconfigured. Configuration problems can be identified by the existence of problems of one component to interact with another component, among other techniques. Component damage can be identified by an inability of a component to execute or improper execution, among other things.

The application health module 620 can be implemented as a process that checks configuration and operational parameters against known or ideal values. Deviation from such known or ideal values can be used as an indicator that an application set, or component thereof, is not functioning properly. The application health module 620 can poll executable components periodically to ensure proper operation. The application health module 620 can also access configuration files, schemas, maps, and other files to ensure that values or parameters of those files have not been changed by an errant process or other reason.

Depending upon a specific component and implementation, the application health module can automatically correct problems with components of the application set 630. For example, the application health module 620 can automatically reinstall a subcomponent of a component if that subcomponent was somehow corrupted or deleted. Configuration files can also be corrected, among others. Files, including maps, schemas, and others, can be replaced with known good copies if copies in use by the application set 630 are detected to be damaged or missing.

The application health module 620 can also notify a user of problems in communication between or among components or application sets. Such notifications can assist in troubleshooting complex problems or problems that are intermittent or difficult to trace to an identified sequence of actions. In cases where problems are not automatically solved by the application health module 620, well thought out error messages can greatly assist in troubleshooting and maintenance tasks.

The subject invention, for example in connection with detection or identification tasks, can employ various artificial intelligence-based schemes for carrying out various aspects thereof. For example, detection of a variance from normal operating parameters can be facilitated by using an automatic classifier system and process. Moreover, when more than one component is in use, an automatic classifier system can be used to identify operational parameters that deviate from the norm.

A classifier is a function that maps an input attribute vector, $X=(x_1, x_2, x_3, x_4, \ldots x_n)$, to a confidence that the input belongs to a class, that is, $f(X)=\text{confidence}(\text{class})$. Such a classification can employ a probabilistic and/or statistical-based analysis (for example, factoring into the analysis utilities and costs) to prognose or infer an action that a user desires to be automatically performed. In the case of software component replacement systems, for example, attributes can be file descriptors such as filenames, signatures, hash functions, upgrade codes, compatibility codes, version numbers, build numbers, release dates, or other data-specific attributes derived from the device driver files and the classes are categories or areas of interest, for example, descriptors of other device drivers that the device driver can update.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to determining whether a device should be sent data.

An artificial intelligence-based component such as a neural network or an SVM can be used to implement various components of the disclosed invention. For example, at least a portion of the configuration module 320 of FIG. 3 can be implemented in such a manner to check and verify values of configuration parameters. The configuration parameters of an application set, such as the application set 330, can be represented as a pattern to be evaluated by the neural network or SVM. Deviations from an ideal or trained pattern can be readily identified and corrected. Such functionality can be especially useful in assisting to correct run-time operation of an application set either statically or as part of a control feedback loop.

A neural network or SVM can also be used to implement the security module 420 of FIG. 4. Various permissions and access levels for a user or group of users can be represented as a pattern that can be evaluated by an artificial intelligence-based component of the security module 420. Deviations from an established pattern, such as a lack of permission or conversely, existence of permissions not expected, can be readily identified by the security module 420. Such an implementation can also be used to identify privilege escalation attacks or other security breaches.

Once an application is fixed and deployed in its environment, an established pattern of communications both within and outside the application set occurs. An artificial intelligence-based component of a communication module, such as the communication module of FIG. 5, can monitor such communications by comparing a sampled communication pattern to an expected or ideal communication pattern. Deviations from the pattern can be used to identify misconfigured components of an application set, problems with design or operation of the application set, or other operational issues.

An application health monitor, such as the application health monitor 620 of FIG. 6, can also include an artificial intelligence-based component like a neural network or SVM, among others. Various configuration parameters and operational aspects of components of an application set can be represented as a pattern that can be evaluated by comparing a sampled pattern to an expected or ideal pattern. Deviations from the expected or ideal pattern can be readily identified and noted for further investigation or corrective action. Such comparison and evaluation can also be used as a basis for diagnosing problems and automatically taking action to correct those problems.

It should be noted that one or more of the cooperating components of an application set can itself or themselves be artificial intelligence-based components. For example, an application set can include not only a neural network or an SVM, but also an expert system. It should also be noted that in accordance with certain aspects of the invention, an expert system can be included in or supplement other components, specifically including components that have diagnostic or corrective functions.

With reference to FIGS. 7-10, flowcharts in accordance to various aspects of the invention are presented. While, for purposes of simplicity of explanation, the one or more methodologies shown herein, for example, in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 7:
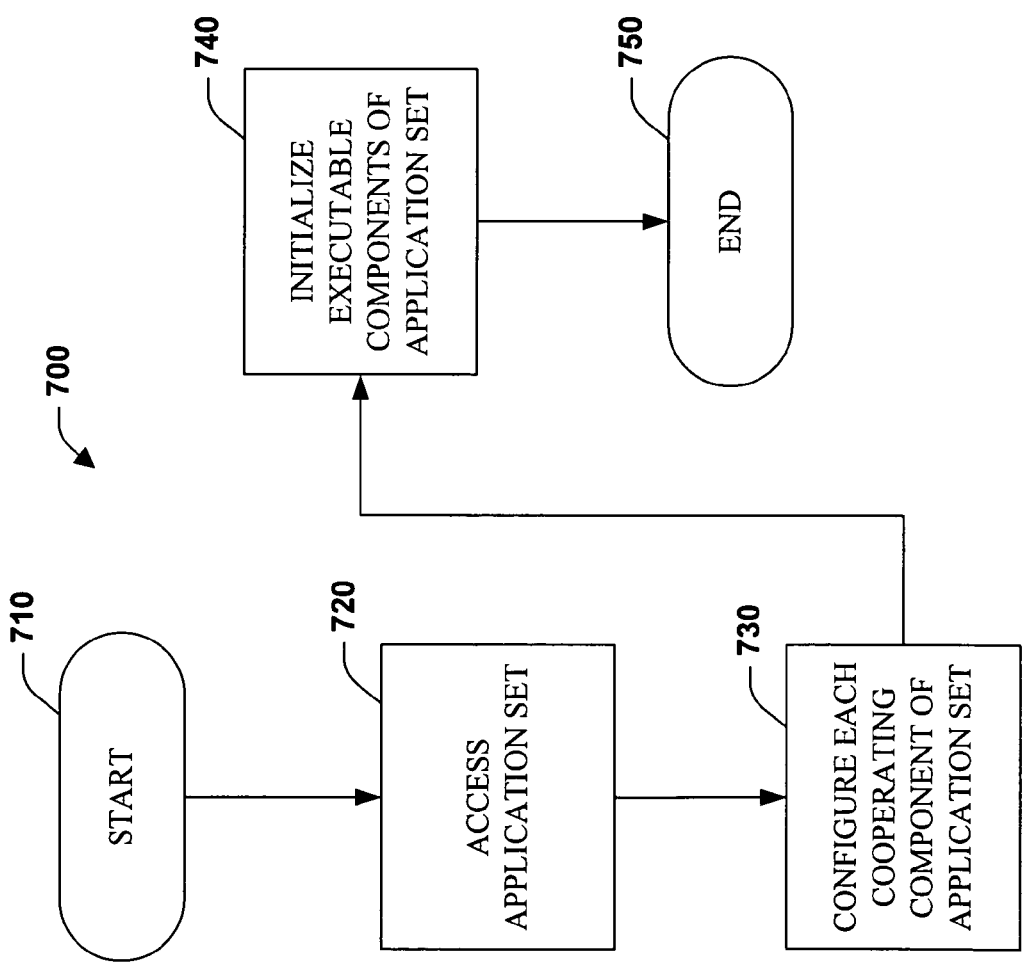
FIG. 7 is a flow diagram of a method in accordance with an aspect of the disclosed invention.

FIG. 7 is a flow diagram that depicts execution of a method 700 in accordance with an aspect of the invention. Specifically, the method 700 can be used to initialize processing of an application data set. Execution of the method 700 begins at START block 710 and continues to process block 720. At process block 720, an application set is accessed by a user. The user can be required to authenticate himself prior to gaining access to the application set. Additionally, an authenticated user can have restricted ability to operate or interact with the application set.

Processing continues to process block 730 where each component of the application set is configured. For components such as schemas, maps, and configuration files, information contained in those files can be checked for accuracy. For components such as executables, the executable can be directly configured or can be initialized to read from an associated configuration component in the application set.

Processing continues from process block 730 to process block 740. At process block 740, execution of the application set is initialized. Initialization is accomplished by starting execution of each executable component of the application set and ensuring the application set is in a steady state prior to beginning processing. When all executable components have been activated and the application set is in a steady state, execution of the application set as a whole can begin. Processing terminates at END block 750.

Figure 8:
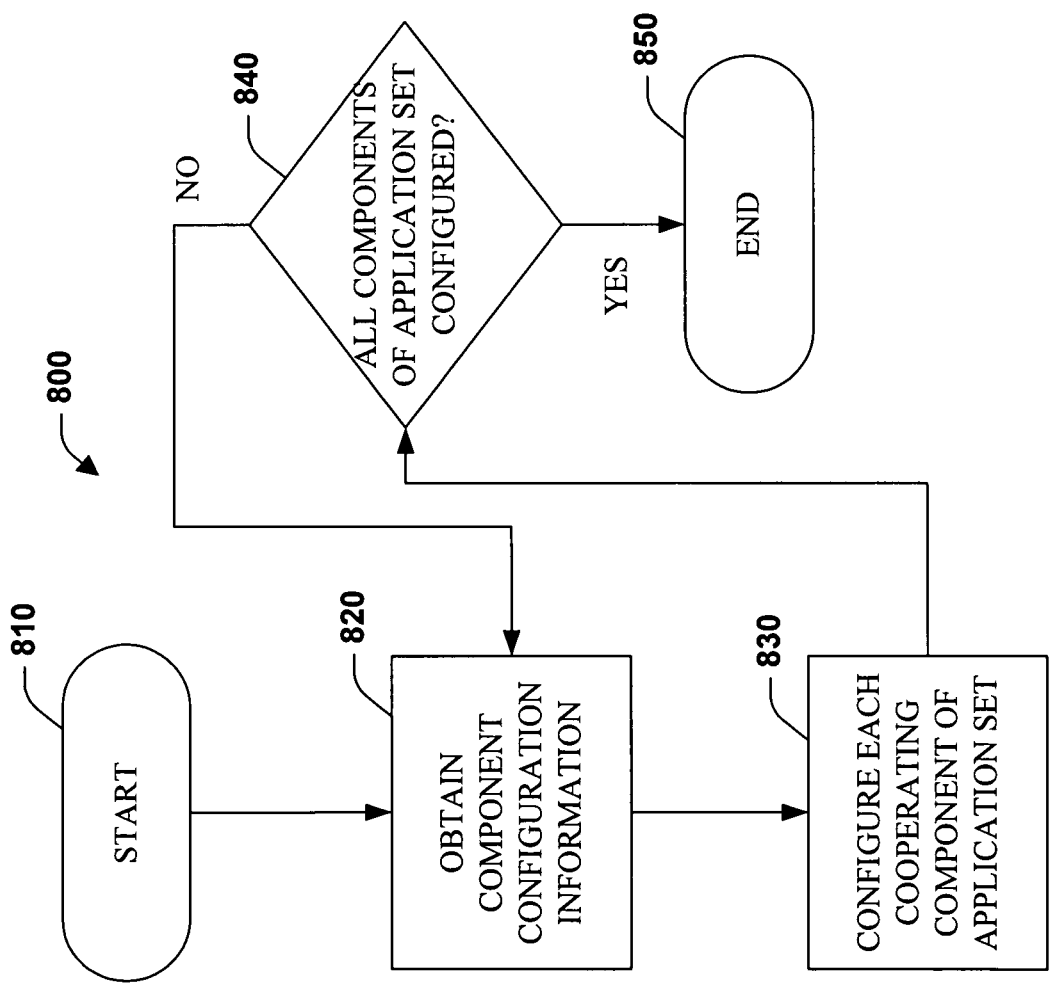
FIG. 8 is a flow diagram of a method in accordance with an aspect of the disclosed invention.

FIG. 8 is a flow diagram of processing of a method 800 in accordance with still another aspect of the disclosed invention. Specifically, a method for configuring components of an application set is presented. Processing begins at START block 810 and proceeds to process block 820. At process block 820, configuration information for a specific component of the application set is obtained. This configuration information can be stored in an application set-level configuration file or in some other appropriate data store such as a database that includes information about the application set and its cooperating components.

Processing continues to process block 830 where an individual component of the application set is configured using information obtained at process block 820. Such configuration can include writing information to internal configuration files that are read by one or more cooperating components, establishing schemas or maps, setting up communication channels or pathways, populating data structures, or other appropriate actions to bring the application set into a state where the application set can begin processing. It should be noted that executable modules of cooperating components can be initialized and begin execution to obtain configuration parameters or await processing inputs from other components.

At decision block 840, a determination is made whether all cooperating components of the application set have been configured. This can be accomplished by referencing a list of components and maintaining a list entry that designates whether a component has yet to be configured. Such an approach can be used in an iterative configuration process that configures one component of an application set at a time. A more complex scheme that performs configuration tasks in parallel can also be used. Alternative approaches, such as an approach that uses a configuration script, are also possible. If the determination made at decision block 840 is no, processing continues to process block 820 where configuration information for another cooperating component is obtained. If the determination is yes, processing terminates at END block 850.

Figure 9:
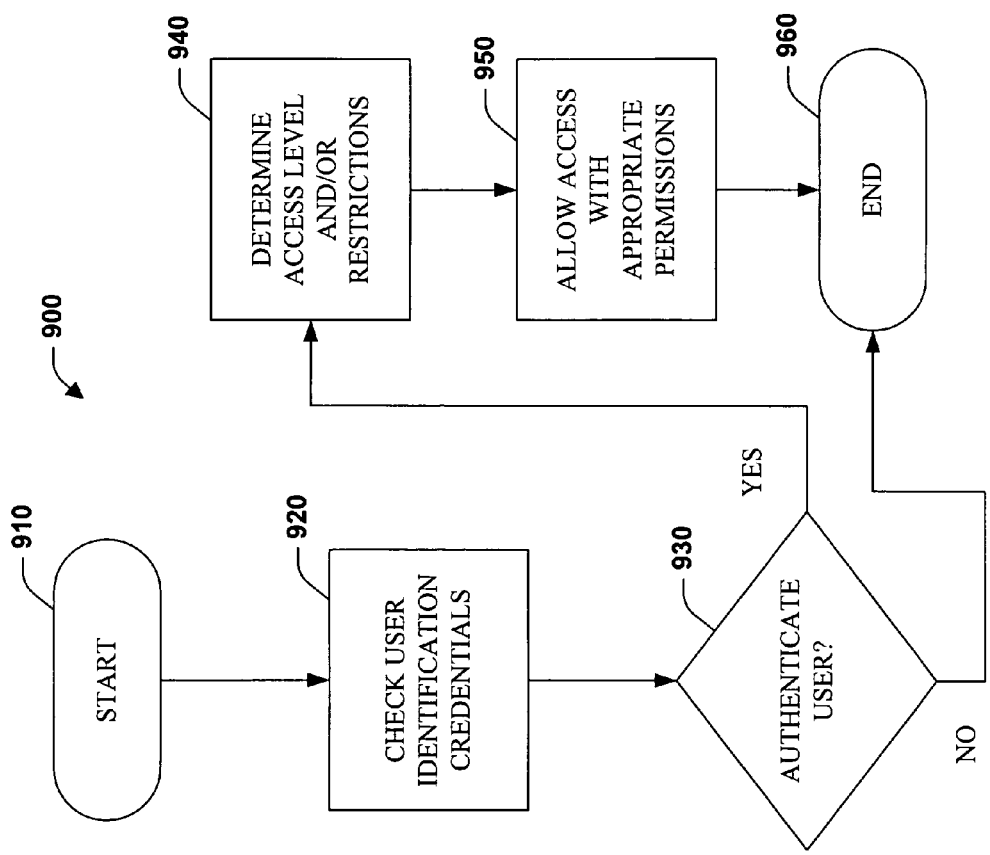
FIG. 9 is a flow diagram depicting a method that may be employed in accordance with another aspect of the disclosed invention.

FIG. 9 is a flow diagram of processing of a method 900 in accordance with yet another aspect of the disclosed invention. Specifically, a method for authenticating a user of an application set is presented. Processing begins at START block 910 and proceeds to process block 920. At process block 920 an attempt to identify a user is performed. This check can be highly implementation-dependent. Security systems typically employ a mechanism that is rooted in one of three basic paradigms: who you are, what you have, or what you know. In one implementation that is an example of the "what you know" paradigm, a user can be presented with a username and password login screen. In another implementation that is an example of the "what you have" paradigm, a security token, such as a token that generates a passphrase according to an algorithm and that is keyed to a login system, can be used. Another implementation of the "what you have" paradigm can use a near-field communication device, such as a radio frequency identification ("RFID") tag to identify a user.

In still another implementation based upon the "who you are" paradigm, biometric information, such as a fingerprint or retina map, can be used to identify the user. Combinations of these approaches are possible and can be highly desirable depending upon an implementation. Of particular note is a scheme that provides a first level of access for providing "what you know," a second level of access for alternately or additionally providing "what you have," and a third level of access for alternately or additionally proving "who you are." Other combinations are possible and will be readily apparent to those of ordinary skill in the art.

At decision block 930, a determination is made whether a user has been authenticated according to the process described in conjunction with process block 920. If that determination is yes, processing continues to process block 940 where a level of access for the user is determined. Such level of access can be determined by accessing a lookup table of authorized users with predefined access levels. Other appropriate mechanisms, such as the multi-stage authentication scheme described above, can also be used.

Processing continues from process block 940 to process block 950 where access to the application set, at a level consistent with permissions established for that user, is granted. Access by the user to certain application sets, components of application sets, or administrative commands can be selectively controlled. Processing concludes at END block 960. Similarly, if the determination made at decision block 930 is no, meaning that the user cannot be authenticated, processing terminates at END block 960.

Figure 10:
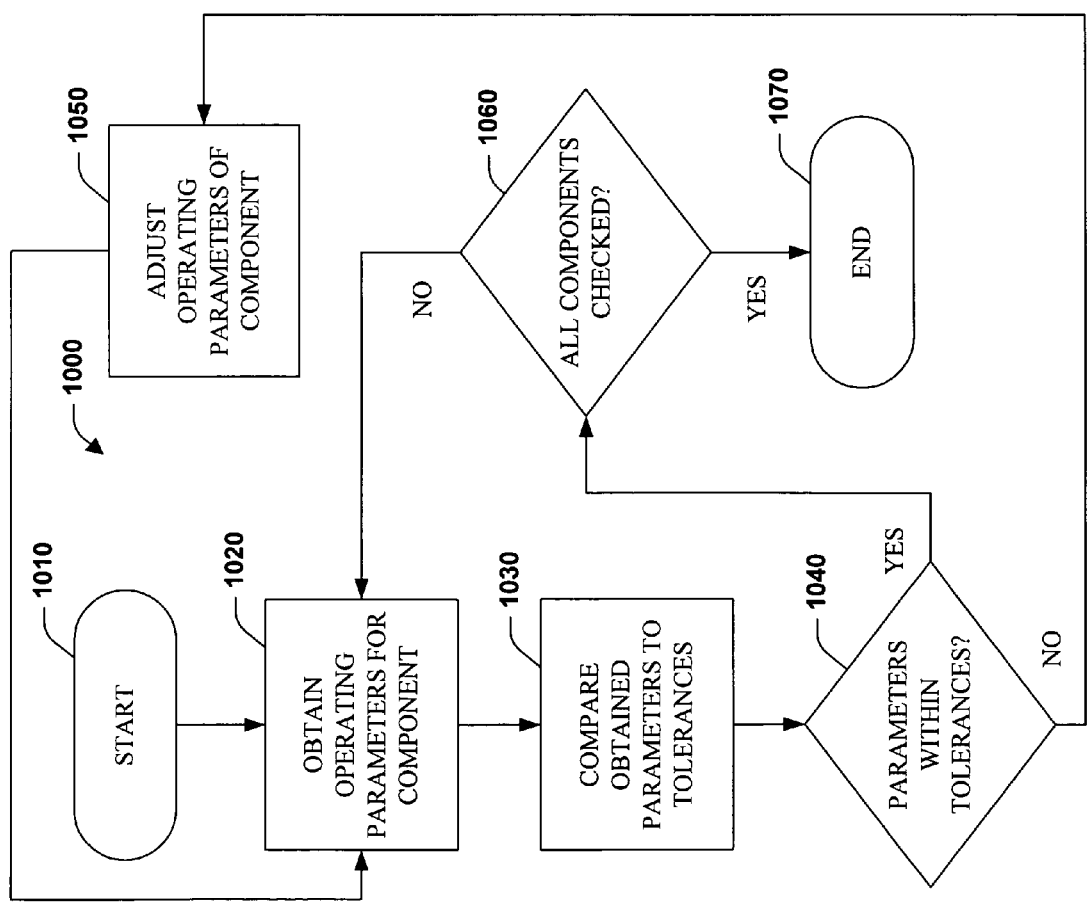
FIG. 10 is a flow diagram depicting a method that can be used in accordance with yet another aspect of the disclosed invention.

FIG. 10 is a flow diagram of processing of a method 1000 in accordance with yet another aspect of the disclosed invention. Specifically, a method for authenticating a user of an application set is presented. Processing begins at START block 1010 and proceeds to process block 1020. At process block 1020, operational parameters for a cooperating component of an application set are obtained. Such operational parameters can include metrics like throughput, resource utilization, and processing time, among others. Metrics and other operational parameters can be obtained from a specialized module that monitors operation of the application set and its cooperating components or can be measured on demand by another component.

Processing continues to process block 1030 where the operational parameters are compared to historical, expected, or ideal operational parameters for a component or the application set. Systems that have complex interdependencies and which run on distributed systems typically do not execute with absolute precision. Therefore, a range of acceptable values for each operating parameter is established. Acceptable values can be derived from studying hardware and software as designed, in actual operation, and over time that includes multiple operational repetitions. Tolerance levels can then be created for each parameter.

At decision block 1040, a determination is made whether an obtained parameter value or metric is within a specified tolerance level. If no, processing continues to process block 1050 where operation of a cooperating component, hardware supporting that cooperating component, or an entire application set is adjusted. In extreme cases execution of an application set can be stopped, reconfigured, and started anew. In other cases, a configuration change to a cooperating component or a reallocation of computing resources (such as addition of available memory) can bring the parameter or metric back within the desired range. Processing continues from process block 1050 at process block 1020 to create a feedback loop such that adjustments can continually be made until a parameter is within a desired range.

If the determination made at decision block 1040 indicates that the parameter or metric is within tolerances, processing continues to decision block 1060. At decision block 1060, a determination is made whether all parameters or metrics of the system have been checked. If no, processing continues at process block 1020 where a parameter or metric to be checked is obtained. If the determination made at decision block 1060 indicates that all components have been checked, processing terminates at END block 1070.

Figure 11:
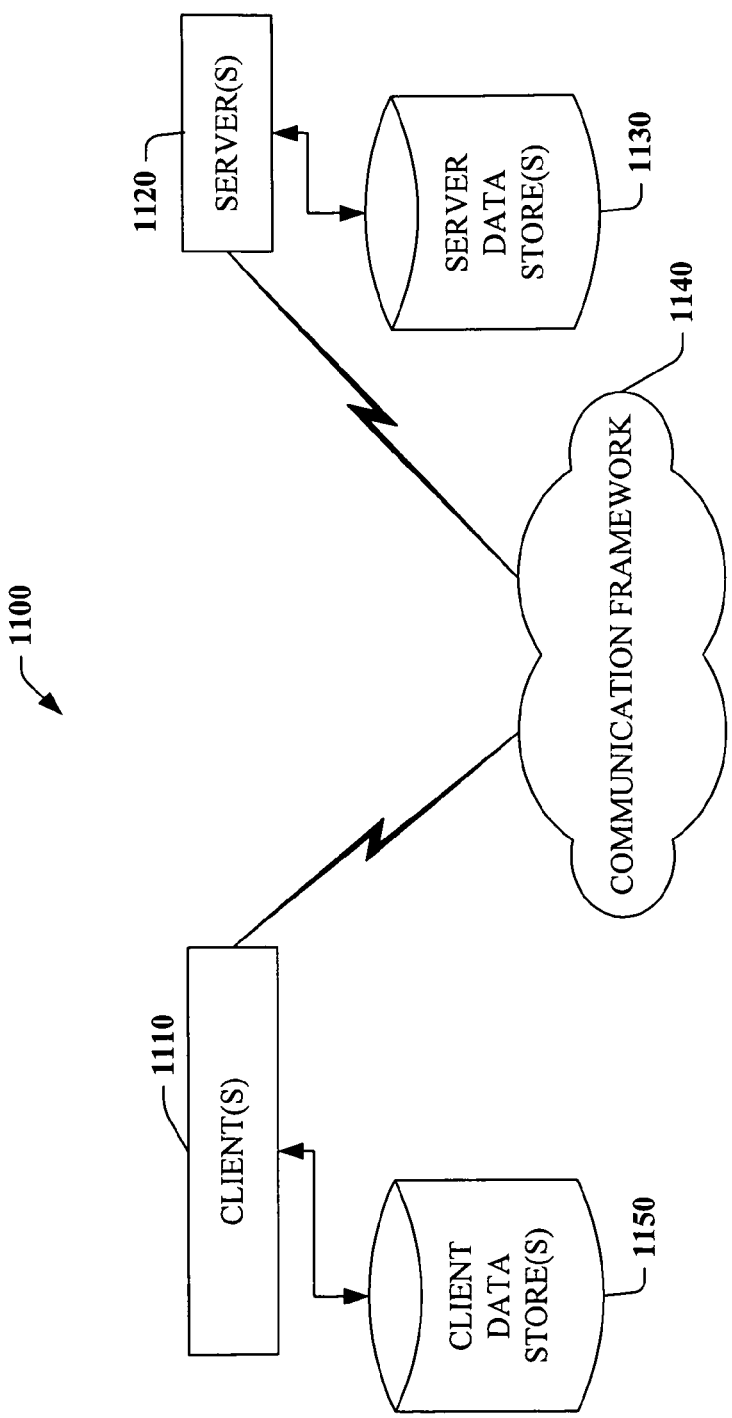
FIG. 11 illustrates an exemplary networking environment, wherein the novel aspects of the subject invention can be employed.
Figure 12:
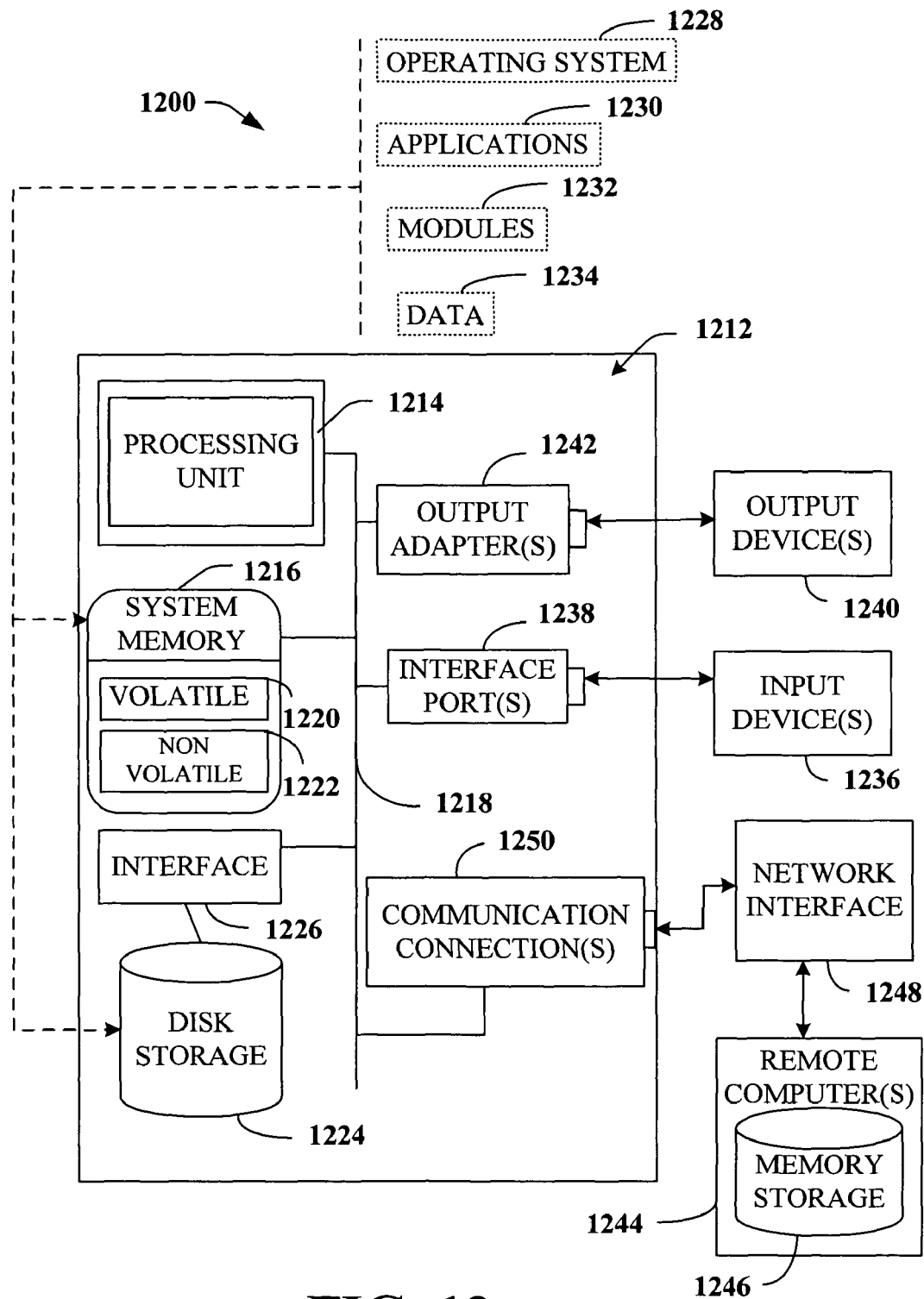
FIG. 12 illustrates an exemplary operating environment, wherein the novel aspects of the subject invention can be employed.

In order to provide additional context for implementing various aspects of the subject invention, FIGS. 11-12 and the following discussion is intended to provide a brief, general description of a suitable computing environment within which various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 11 is a schematic block diagram of a sample-computing environment 1100 with which the subject invention can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads or processes to perform transformations by employing the subject invention, for example.

One possible means of communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1140.

With reference to FIG. 12, an exemplary environment 1200 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. For example, FIG. 12 illustrates a disk storage 1224. The disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. The operating system 1228, which can be stored on the disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. The input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer system for managing application sets, comprising:
    a processor;
    computer-readable storage medium;
    a first application set and a second application set stored on the computer readable medium, the first application set and the second application set including a plurality of interrelated components, the plurality of interrelated components being arranged within the first application set and the second application set in both an hierarchical manner and in a non-hierarchical manner such that each of the components of the first application set cooperates with at least one other component of the first application set such that the first application set functions as a single integrated unit and includes at least one stand-alone executable application and each of the components of the second application set cooperates with at least one other component of the second application set such that the second application set functions as a single integrated unit and includes at least one stand-alone executable application;
    a first wrapper for the first application set that designates the components that are a member of the first application set, wherein the first wrapper defines and preserves a first architecture of the computer system that includes the first application set when changes are made the first application set, maps the components of the first application set to specific hardware of the computer system, and imposes a logical grouping on the arrangement of the components of the first application set;
    a second wrapper for the second application set that designates the components that are members of the second application set, wherein the second wrapper is different from the first wrapper and wherein the second wrapper defines and preserves a second architecture of the computer system that includes the second application set when changes are made to the second application set, maps the components of the second application set to specific hardware of the computer system, and imposes a logical grouping on the arrangement of the components of the second application set; and
    a control module that uses an interface to the first and second application sets and manage the individual components of the first and second application sets.

2. The system of claim 1, wherein the first wrapper is an abstract wrapper such that the abstract wrapper comprises identifying information that is associated with each member of the first application set.

3. The system of claim 2, wherein the abstract wrapper is one of a tag that is applied to a component of the first application set, an entry in a data store that identifies the component of the first application set, a data structure that includes a reference to the component of the first application set, and an object that includes a reference to the component of the first application set.

4. The system of claim 1, wherein the first wrapper is a container for a component of the first application set.

5. The system of claim 4, wherein the container is one of a data structure that includes the component and an object that encapsulates the component.

6. The system of claim 1, wherein a component of the first application set is one of an executable that directly performs at least part of a task to be performed by the application set, a schema, a map, an adapter, a pipeline, a communication module, a rule, a set of rules, a certificate, a set of certificates, a data store, and a configuration component.

7. The system of claim 1, further comprising a security module that selectively permits use of the first and second application sets.

8. The system of claim 1, further comprising an information segregation module that controls access to messages associated with a component of the first application set.

9. The system of claim 1, further comprising an application health module that monitors behavior of the first and second application sets.

10. In a computer system, the computer system including system memory, a processor, and a physical computer-readable medium, the computer-readable medium having stored thereon a first application set and a second application set, a method for managing a set of cooperating components of the first or second application set as a single entity, comprising:
    an act of designating a first wrapper for the first application set that designates the components that are a member of the first application set, wherein the first wrapper defines and preserves a first architecture of the computer system that includes the first application set when changes are made the first application set, maps components of the first application set to specific hardware of the computer system, and imposes a logical grouping on the arrangement of the components of the first application set;

an act of designating a second wrapper for the second application set that designates the components that are members of the second application set, wherein the second wrapper is different from the first wrapper and wherein the second wrapper defines and preserves a second architecture of the computer system that includes the second application set when changes are made to the second application set, maps components of the second application set to specific hardware of the computer system, and imposes a logical grouping on the arrangement of the components of the second application set;

the first application set and the second application set including a plurality of interrelated components, the plurality of interrelated components being arranged within the first application set and the second application set in both an hierarchical manner and in a non-hierarchical manner such that each of the components of the first application set cooperates with at least one other component of the first application set such that the first application set functions as a single integrated unit and includes at least one stand-alone executable application and each of the components of the second application set cooperates with at least one other component of the second application set such that the second application set functions as a single integrated unit and includes at least one stand-alone executable application; and an act of using an application set control module to manage the first and second application sets and manage the individual components of the first and second application.

11. The method of claim 10, wherein designating a first wrapper for the first application set includes tagging each of the plurality of cooperating components of the first application set with an identifier.

12. The method of claim 10, wherein using an application set control module to manage the first and second application sets and manage the individual components of the first and second application sets includes starting execution of the first or second application set.

13. The method of claim 10, wherein using an application set control module to manage the first and second application sets and manage the individual components of the first and second application sets includes configuring the at least one member of the first or second application set.

14. The method of claim 10, further comprising selectively limiting access by a user to the first or second application set.

15. The method of claim 10, further comprising monitoring operation of the first or second application set.

16. A computer program product for use at a computer system, the computer program product comprising one or more computer-readable storage media, the computer-readable storage medium having stored thereon a first application set and a second application set, the computer-readable storage media also storing computer-executable instructions that, when executed by a processor, cause the computer system to perform a method for managing a set of cooperating components of the first or second application set as a single entity, comprising:

an act of designating a first wrapper for the first application set that designates the components that are a member of the first application set, wherein the first wrapper defines and preserves a first architecture of the computer system that includes the first application set when changes are made the first application set, maps components of the first application set to specific hardware of the computer system, and imposes a logical grouping on the arrangement of the components of the first application set;

an act of designating a second wrapper for the second application set that designates the components that are members of the second application set, wherein the second wrapper is different from the first wrapper and wherein the second wrapper defines and preserves a second architecture of the computer system that includes the second application set when changes are made to the second application set, maps components of the second application set to specific hardware of the computer system, and imposes a logical grouping on the arrangement of the components of the second application set;

the first application set and the second application set including a plurality of interrelated components, the plurality of interrelated components being arranged within the first application set and the second application set in both an hierarchical manner and in a non-hierarchical manner such that each of the components of the first application set cooperates with at least one other component of the first application set such that the first application set functions as a single integrated unit and includes at least one stand-alone executable application and each of the components of the second application set cooperates with at least one other component of the second application set such that the second application set functions as a single integrated unit and includes at least one stand-alone executable application; and an act of using an application set control module to manage the first and second application sets and manage the individual components of the first and second application sets.

17. The computer program product of claim 16, wherein designating a first wrapper for the first application set includes tagging each of the plurality of cooperating components of the first application set with an identifier.

18. The computer program product of claim 16, wherein using an application set control module to manage the first and second application sets and manage the individual components of the first and second application sets includes starting execution of the first or second application set.

19. The computer program product of claim 16, wherein using an application set control module to manage the first and second application sets and manage the individual components of the first and second application sets includes configuring the at least one member of the first or second application set.

20. The computer program product of claim 16, further comprising selectively limiting access by a user to the first or second application set.

* * * * *